(12) United States Patent
Zhang

(10) Patent No.: US 11,429,633 B2
(45) Date of Patent: Aug. 30, 2022

(54) DATA PROCESSING SYSTEM WITH SYNCHRONIZATION OF LOCAL DIRECTORY INFORMATION TO CLOUD SYSTEM

(71) Applicant: Citrix Systems, Inc., Fort Lauderdale, FL (US)

(72) Inventor: Pengcheng Zhang, Jiangsu (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 684 days.

(21) Appl. No.: 15/616,052

(22) Filed: Jun. 7, 2017

(65) Prior Publication Data

US 2018/0357294 A1    Dec. 13, 2018

(51) Int. Cl.
*G06F 16/27* (2019.01)
*H04L 9/40* (2022.01)
*G06F 21/55* (2013.01)
*G06F 21/64* (2013.01)

(52) U.S. Cl.
CPC ............ *G06F 16/27* (2019.01); *G06F 21/552* (2013.01); *G06F 21/64* (2013.01); *H04L 63/102* (2013.01); *H04L 63/20* (2013.01)

(58) Field of Classification Search
CPC ........ G06F 16/27; G06F 21/64; G06F 21/552; H04L 63/20; H04L 63/102
See application file for complete search history.

(56) References Cited

U.S. PATENT DOCUMENTS

| | | | |
|---|---|---|---|
| 9,110,892 B2 | 8/2015 | Didcock et al. | |
| 9,307,006 B2 | 4/2016 | Micucci et al. | |
| 9,432,457 B2 | 8/2016 | Marano et al. | |
| 9,641,599 B2 | 5/2017 | Wesley et al. | |
| 2005/0273654 A1* | 12/2005 | Chen | G06F 11/2082 714/13 |
| 2012/0179732 A1 | 7/2012 | Caso et al. | |
| 2015/0052105 A1 | 2/2015 | Nguyen | |
| 2016/0063027 A1 | 3/2016 | Brand | |
| 2016/0253352 A1* | 9/2016 | Kluck | H04L 67/1097 707/638 |
| 2017/0124111 A1* | 5/2017 | Sharma | G06F 16/178 |
| 2017/0177613 A1* | 6/2017 | Sharma | G06F 21/45 |
| 2017/0249328 A1 | 8/2017 | Liang et al. | |

* cited by examiner

*Primary Examiner* — Charles D Adams
(74) *Attorney, Agent, or Firm* — BainwoodHuang

(57) ABSTRACT

A primary domain controller maintains synchronization of directory information (e.g., Active Directory information) between local directory controllers in a local domain and cloud directory controllers in a cloud domain. The primary domain controller subscribes to directory event reports for selected directory events occurring at the local directory controllers, such as addition, deletion or modification of user accounts. Upon receiving the directory event reports, the primary domain controller creates corresponding directory event records in an event log, and regularly forwards contents of the directory event records of the event log to the cloud directory controllers for use in updating system directory information in the cloud domain.

16 Claims, 4 Drawing Sheets

DATA PROCESSING SYSTEM WITH SYNCHRONIZATION OF LOCAL DIRECTORY INFORMATION TO CLOUD SYSTEM

BACKGROUND

The present invention is related to the field of distributed data processing systems, and in particular to the management of system directory information (e.g., Active Directory information) in distributed data processing systems.

SUMMARY

Disclosed is a technique in which a subscription event log is maintained on a directory controller (e.g., Active Directory domain controller) on which is also installed an directory synchronization component, also referred to herein as a synchronization "tool". An event log subscription is used to record specific directory events occurring across a set of domain controllers in a local domain. The synchronization tool monitors the event log subscription by scanning event records, and synchronizes the local domain with a cloud domain by forwarding directory event information from the event log to the cloud domain.

More particularly, a method is disclosed of operating a primary domain controller in a local domain of a data processing system to maintain synchronization of system directory information between a set of local directory controllers in the local domain and one or more cloud directory controllers in a separate cloud domain, wherein the system directory information describes members (e.g., users) of the data processing system along with respective authentication and authorization information. In one embodiment, the system directory scheme employs the Active Directory technology of Microsoft Corporation.

The method includes, by the primary domain controller, subscribing to directory event reports for selected directory events occurring at the local directory controllers, the directory events modifying the system directory information at the local directory controllers. Examples of such events include addition, deletion or modification of user accounts, such as when a new user is added as a member of the system or an existing user is removed and thus no longer a member of the system.

The method further includes, upon receiving the directory event reports from the local directory controllers, creating corresponding directory event records in an event log of the primary domain controller. The primary domain controller regularly forwards contents of the directory event records of the event log to the cloud directory controllers for use in updating system directory information in the cloud domain.

The technique thus uses an event log subscription to monitor the events of other controllers. The primary domain controller is configured so that that event information of the subscription is written into system files, and a worker thread (sync component/tool) fetches user related events from subscription files and forwards the event information to the cloud domain.

One aspect of the disclosed technique is that a single directory synchronization tool may be installed in the local domain, forwarding event information to the cloud domain on behalf of multiple local domain controllers. The cloud directory controller(s) receive only one report on each event within the local domain. In the disclosed technique a single system directory controller can synchronize directory information (e.g., for new user members of system directory groups) to the cloud, even when the directory information is created or modified on domain controllers without a synchronization tool installed.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
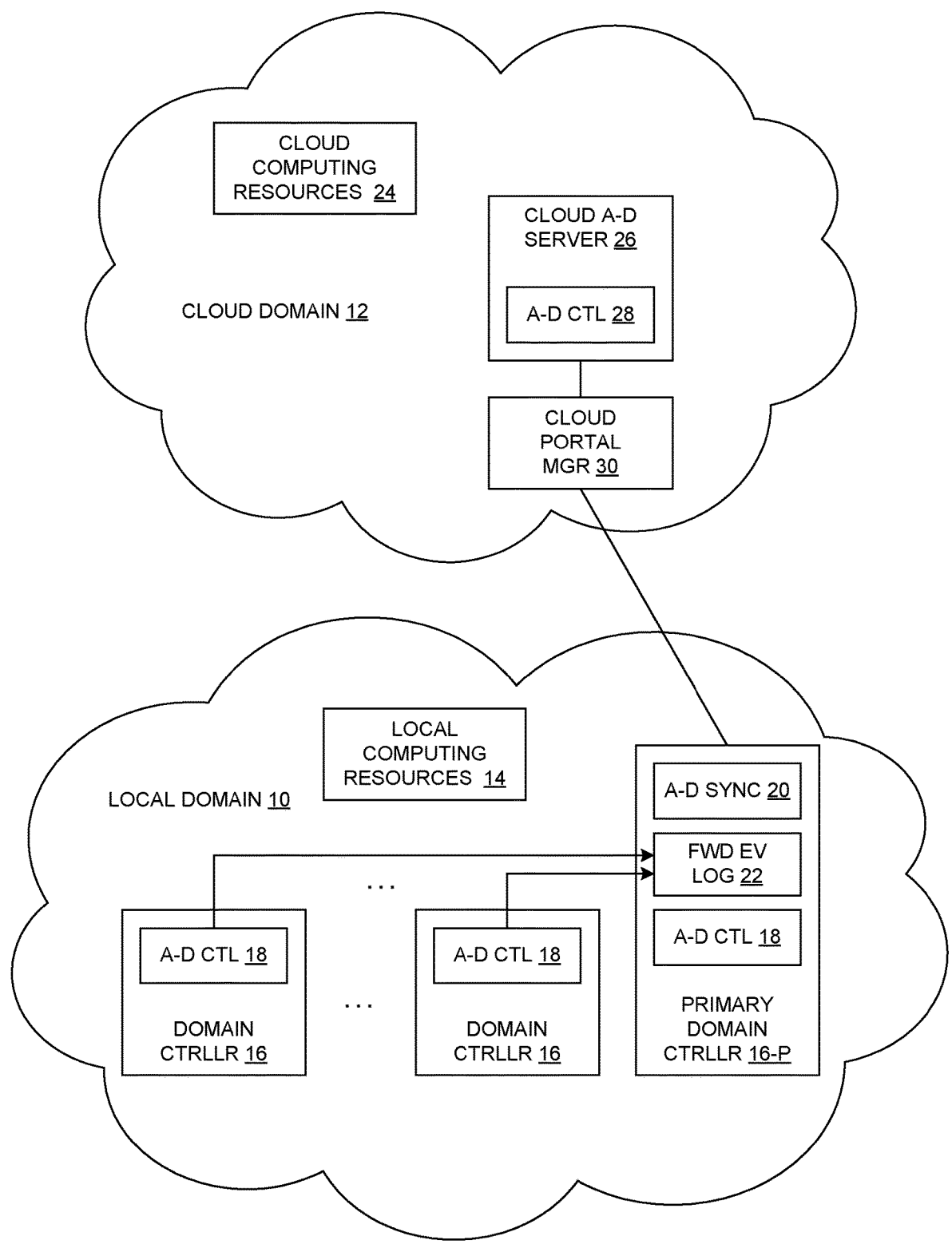
FIG. 1 is a block diagram of a data processing system.

Disclosed is a technique in which one domain controller uses event log subscriptions to subscribe to specific events from other domain controllers in a local domain. Worker threads are created as part of a directory synchronization tool to monitor forwarded events in the event log subscription. When there is an event indicating creation or modification of certain system directory information, such as a new user being added to a watched user group, the worker thread synchronizes the information to the cloud domain.

In one embodiment, one controller in a multiple-controller domain is first selected as a primary controller. This primary controller executes a system directory synchronization tool.

A subscription is created in an event viewer executed on the primary controller. The subscription records specific events occurring on other domain controllers. For example, the subscription may focus on events such as adding users to or removing users from certain groups. After the subscription is created, the events are recorded in a designated file referred to herein as a "forwarded event log", which in one specific example can be a file identified as %SystemRoot%/System32/winevt/Log/ForwardedEvents.evtx.

To make the records be available to a system event log API, the file path can be added into the local environment, e.g., by using an event log registry key such as the following:

HKEY_LOCAL_MACHINE\SYSTEM\CurrentControlSet\Services\Eventlog\File

Next, an event worker thread is created in the directory synchronization tool, which runs the following tasks periodically:

Scan the records in subscription since a last scanned event index

If finding an addition or modification of interest (e.g., adding users to or removing users from a user group), extract the pertinent information (e.g., the group id and user id)

Get more information from the environment if necessary (e.g., if the user group is a watched group, get more user info for the user from the A-D controller Call a cloud portal manager API to synchronize the new/modified information to the cloud domain Update the last scanned event index In this way, the event worker in the synchronization tool can monitor the events when users are added or removed on other controllers to the watched user groups. The users are then synced into the cloud portal manager system.

The disclosed technique can be used to synchronize not only users in a multiple-controller domain, but also other directory objects such as user groups and organization units. The event worker can monitor the corresponding events via the event log subscription, and then synchronize the A-D objects into the cloud portal manager system.

Embodiments in the Drawings

FIG. 1 shows a distributed data processing system having components in a local domain 10 and in a cloud domain 12. The local domain 10 includes computing resources under direct control of an organization, such as in a data center or campus of a corporation or university for example, while the cloud domain 12 includes computing resources that are committed to and used by the organization but provided by a distinct cloud service provider (CSP). One example of a cloud service platform is Azure® from Microsoft.

The local domain 10 includes various local computing resources 14 including hardware such as server computers (servers), network printers, data storage, communications devices, etc., as well as software-implemented applications such as email, database, etc. (specifics not shown). A set of domain controllers 16 provide system directory services to the applications, i.e., information regarding users, their manner of authentication, and their rights for using/accessing the applications and other system resources. In one embodiment the domain controllers 16 implement a specific type of system directory service known as Active Directory (A-D), and include respective Active Directory controllers (A-D CTL) 18. The remaining description focuses primarily on an A-D implementation, but those skilled in the art will appreciate that the disclosed techniques are applicable to other implementations of system directory services.

One of the domain controllers 16 plays a special role and is designated a "primary" domain controller 16-P. Beyond the A-D controller 16 it also includes an Active Directory synchronizer (A-D SYNC) 20 and a forwarded event log (FWD EV LOG) 22. These are described in more detail below.

The cloud domain 12 similarly includes hardware- and software-implemented cloud computing resources 24 dedicated to use by the same organization that owns the local domain 10. The cloud domain 12 may provide a variety of cloud-based services including hosted applications, hosted desktops, etc. The cloud domain 12 includes one or more cloud A-D servers 26, each having a corresponding A-D controller 28. The cloud domain 12 also includes a specialized interface component shown as a cloud portal manager (MGR) 30, which in one embodiment can be realized by a Cloud Portal Manager application sold by Citrix Systems, Inc.

Figure 2:
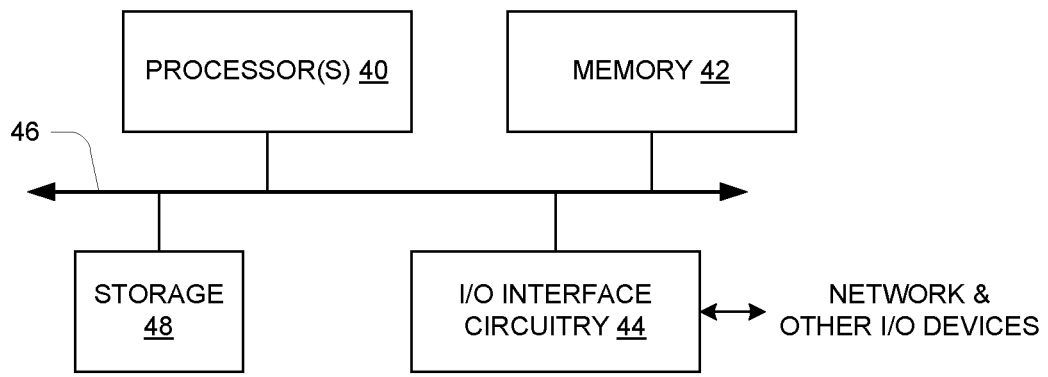
FIG. 2 is a block diagram of a computer from a hardware perspective.

FIG. 2 shows an example hardware configuration of a physical computer or controller such as may be used to realize the computing devices (e.g., servers, domain controllers, etc.) in the local domain 10 and cloud domain 12 of FIG. 1. The hardware includes one or more processors 40, memory 42, and interface circuitry 44 interconnected by data interconnections 46 such as one or more high-speed data buses. The interface circuitry 44 provides hardware external connections such as to external networks for reaching remote devices and perhaps other external devices/connections (EXT DEVs). The processor(s) 40 with connected memory 42 may also be referred to as "processing circuitry" herein. There may also be local storage 48 such as a local-attached disk drive or Flash drive. In operation, the memory 42 stores data and instructions of system software (e.g., operating system) and one or more application programs which are executed by the processor(s) 40 to cause the hardware to function in a software-defined manner. Thus the computer hardware executing instructions of a system directory application, such as described herein, can be referred to as system directory component, and it will be understood that a collection of such software-implemented components can all be realized and interact with each other as one or more sets of computer processing hardware executing different computer programs as generally known in the art.

Referring again to FIG. 1, as outlined above, in operation the A-D controllers 18, 28 are repositories of system directory information as well as sources of change of the system directory information. The organization that owns and manages the local domain 10 does not want to manage the A-D aspect of the cloud domain 12, e.g., by having to create and manage user accounts, etc. With respect to the example of user accounts, each A-D controller 18, 28 has information describing each of a set of user accounts, including for example a respective password (or other authentication data) and access rights information describing the user's ability to use system resources (e.g., applications, data collections, network connections, etc.). If a system administrator modifies user account information on a given local A-D controller 18, the modification is propagated to the other local A-D controllers 18 as well as to the A-D controller 28 of the cloud domain 12. The propagation within the local domain 10 may be handled by known protocols for distributed system directory schemes. The present disclosure is concerned primarily with the manner of synchronizing local changes or modifications occurring at the local A-D controllers 18 with the A-D controllers 28 of the cloud domain 12.

Figure 3:
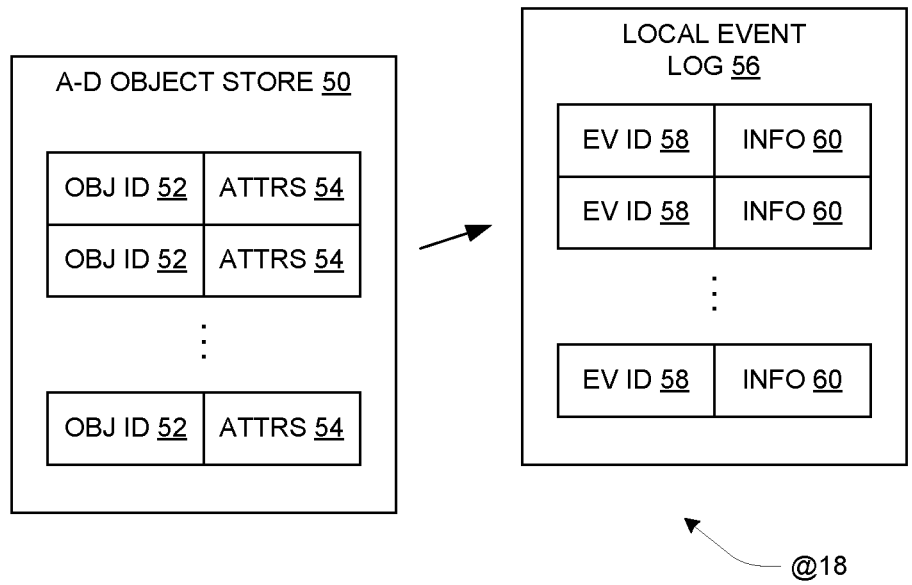
FIG. 3 is a schematic diagram of an active directory object store and local event log.

FIG. 3 shows certain data structures maintained at the A-D controllers 18. An A-D object store 50 is the primary store for A-D information used in the A-D operation of the A-D controllers 18, such as user accounts etc. as mentioned above. This data is shown as a collection of records each having a data object identifier (OBJ ID) 52 and an associated set of object attributes (ATTRS) 54. Referring again to the user account example, a given user account may be represented as a record for which the object identifier 52 is an identifier of the user account (e.g., a serial number or alphanumeric string uniquely identifying a particular user account) and the attributes 54 are attributes of that user account. These might include, for example, a user name, password, access control data describing this accounts access privileges to system resources, etc.

A local event log 56 is used to track modifications of the contents of the A-D object store 40. Each time a modification is made, for example by action of a system administrator, a corresponding entry is made in the local event log 56. Each entry includes an identifier for the modification event, shown as EV ID 58, and information about the modification event, shown as INFO 60. Example event information can include a description of the changes made to one or more object entries of the A-D object store 50, the identity of the entity (e.g., human administrator) making the change, a timestamp, etc. The respective event logs 56 of all the A-D controllers 18 are the sources of event information that is synchronized to the cloud domain 12 via the forwarded event log 22 (FIG. 1) of the primary domain controller 16-P, as described more below.

Figure 4:
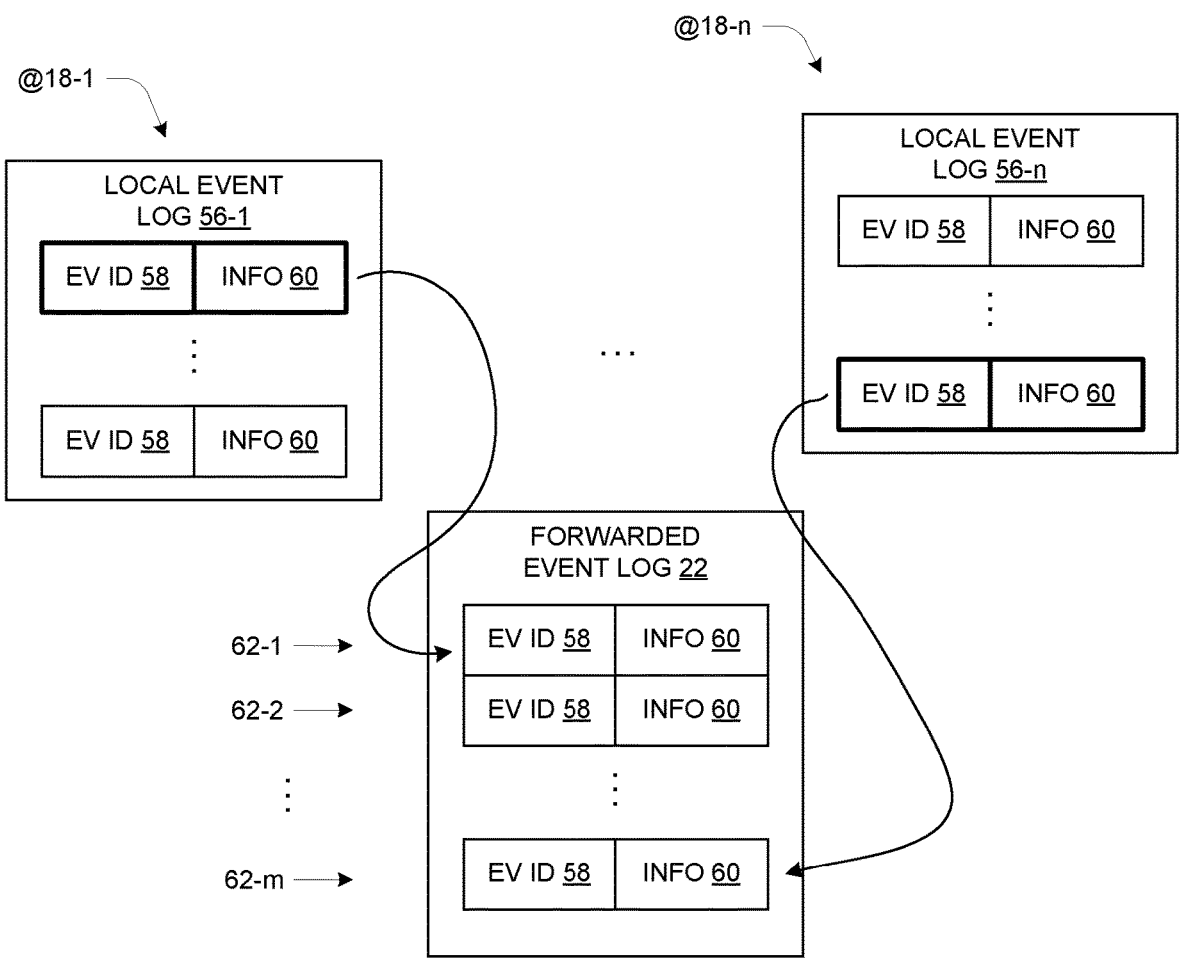
FIG. 4 is a schematic depiction of forwarding event information from local event logs to a forwarded event log.

FIG. 4 illustrates how subscriptions are used so that only selected events from the local event logs 56 of the domain controllers 16 are provided to the primary domain controller 16-P for storage in the forwarded event log 22. In this example, a first record 62-1 is obtained from a first local event log 56-1, and a last record 62-m is obtained from an nth local event log 56-n. In this description the event data sent in connection with a subscription is referred to as a "directory event report". Thus the records from the local event logs 56-1, . . . , 56-n are provided in respective directory event reports to the primary domain controller 16-P, where the event contents are used to populate the forwarded event log 22.

Figure 5:
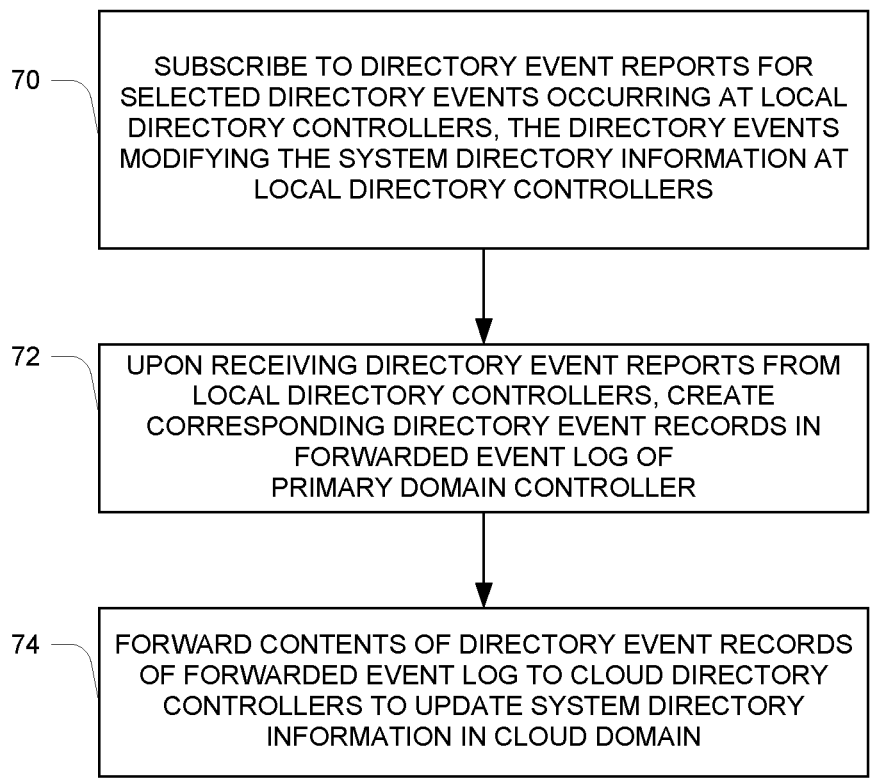
FIG. 5 is a flow diagram of operation of a primary domain controller having a system directory synchronization component.

FIG. 5 illustrates operation of a domain controller (e.g., primary domain controller 16-P) for synchronizing local system directory information from local domain controllers (e.g., domain controllers 16) to a cloud domain (e.g., cloud domain 12). As explained above, the system directory information describes members (e.g., users) of the data processing system along with respective authorization information.

At 70, the domain controller subscribes to directory event reports for selected directory events occurring at the local directory controllers, wherein the directory events are of types that modify the system directory information at the local directory controllers. In the illustrated embodiment, this subscription takes the form of event subscriptions established at each of the local domain controllers 16, indicating that certain events that are added to the local event logs 56 should be reported by sending respective event reports to the primary domain controller 16-P.

At 72, upon receiving the directory event reports from the local directory controllers, the domain controller creates corresponding directory event records in a forwarded event log (e.g., the forwarded event log 22).

At 74, the domain controller forwards the contents of directory event records of the forwarded event log to the cloud directory controllers for use in updating system directory information in the cloud domain.

Figure 6:
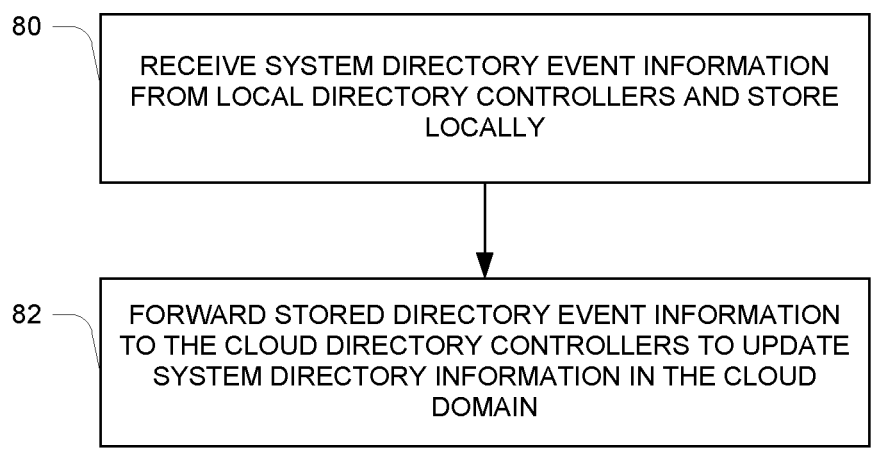
FIG. 6 is a flow diagram of more generalized operation of a primary domain controller having a system directory synchronization component.

FIG. 6 presents a more generalized description of operation.

At 80, the domain controller receives directory event information from the local directory controllers and stores the information locally (e.g., in a forwarded event log 22).

At 82, the domain controller forwards stored directory event information to the cloud directory controllers for use in updating system directory information in the cloud domain.

While various embodiments of the invention have been particularly shown and described, it will be understood by those skilled in the art that various changes in form and details may be made therein without departing from the scope of the invention as defined by the appended claims.

What is claimed is:

1. A method of synchronizing system directory information from a plurality of local directory controllers in a local domain of a data processing system to a cloud directory controller in a separate cloud domain, the system directory information including user account information describing each of a set of user accounts, including user authentication and authorization information, comprising:

operating one of the local directory controllers as a primary domain controller having respective first connections to others of the local directory controllers and a second connection to the cloud directory controller, the local directory controllers being local domain controllers that each (1) maintain system directory information in a respective local directory object store and local directory event information in a respective local event log, and (2) create directory event reports from the local event log based on local changes to system directory information in the local directory object store, the other local directory controllers sending their respective directory event reports to the primary domain controller for forwarding the directory event information to the cloud directory controller by the primary domain controller; and by the primary domain controller:

(1) subscribing to the directory event reports for selected directory events occurring at the other local directory controllers, the directory events including adding a new user, removing an existing user, and modifying information for an existing user, the directory events modifying the system directory information at the local directory controllers;

(2) upon receiving the directory event reports from the other local directory controllers via the respective first connections, creating corresponding directory event records in an event log of the primary domain controller; and (3) forwarding contents of the directory event records of the event log of the primary domain controller to the cloud directory controller via the second connection for use in updating system directory information in the cloud domain.

2. The method of claim 1, wherein an event worker thread in the primary domain controller monitors events via an event log subscription, and then synchronizes directory objects into a cloud portal manager system of the cloud domain.

3. The method of claim 2, wherein the event worker thread runs the following tasks periodically:

scanning the records in the event log subscription since a last scanned event index;

upon finding an addition or modification to be forwarded to the cloud domain, extracting pertinent information, and obtaining additional information from a local operating environment if necessary;

executing a call according to a cloud portal manager API to synchronize the addition or modification as well as the additional information to the cloud domain; and updating the last scanned event index to reflect the above processing.

4. The method of claim 1, wherein the system directory information includes user groups and organization units as directory objects to be synchronized to the cloud domain.

5. The method of claim 1, wherein the cloud domain provides cloud-based services including hosted applications or hosted desktops, and the cloud directory controller maintains system directory information for users using the cloud-based services within the cloud domain.

6. The method of claim 5, wherein the cloud domain includes a cloud portal manager providing an interface to the cloud directory controller from the primary domain controller.

7. The method of claim 1, wherein the local directory object stores of the local domain controllers are collections of records having (1) object identifiers identifying user accounts and (2) attributes of the user accounts.

8. The method of claim 7, wherein the attributes of the user accounts include user names, passwords, and access control data describing access privileges to system resources.

9. The method of claim 1, wherein the subscribing takes the form of event subscriptions established at the local domain controllers, indicating that certain directory events that are added to the local event logs should be reported by sending directory event reports to the primary domain controller.

10. The method of claim 1, wherein the local domain includes local server computers executing corresponding applications, and wherein the local directory controllers provide system directory services to the applications based on the system directory information in the local directory object stores.

11. A computer for use as a primary domain controller being one of a plurality of local directory controllers in a local domain of a data processing system to maintain synchronization of system directory information from the local directory controllers to a cloud directory controller in a separate cloud domain, the system directory information including user account information describing each of a set of user accounts, including user authentication and authorization information, comprising:
  one or more processors;
  memory coupled to the processors; and
  input/output interface circuitry coupled to the memory and processors by one or more high-speed data buses, the input/output interface circuitry providing respective first connections to others of the local directory controllers and a second connection to the cloud directory controller, the local directory controllers being local domain controllers that each (1) maintain system directory information in a respective local directory object store and local directory event information in a respective local event log, and (2) create directory event reports from the local event log based on local changes to system directory information in the local directory object store, the other local directory controllers sending their respective directory event reports to the primary domain controller for forwarding the directory event information to the cloud directory controller by the primary domain controller,
  the memory storing computer program instructions which, when executed by the processors, cause the computer to perform a method including:
    subscribing to directory event reports for selected directory events occurring at the other local directory controllers, the directory events including adding a new user, removing an existing user, and modifying information for an existing user the directory events modifying the system directory information at the local directory controllers;
    upon receiving the directory event reports from the other local directory controllers via the respective first connections, creating corresponding directory event records in an event log of the primary domain controller; and
    forwarding contents of the directory event records of the event log of the primary domain controller to the cloud directory controller via the second connection for use in updating system directory information in the cloud domain.

12. The computer of claim 11, wherein the method performed by the computer further includes execution of an event worker thread to monitor events via an event log subscription, and then synchronizes directory objects into a cloud portal manager system of the cloud domain.

13. The computer of claim 12, wherein the event worker thread runs the following tasks periodically:
  scanning the records in the event log subscription since a last scanned event index;
  upon finding an addition or modification to be forwarded to the cloud domain, extracting pertinent information, and obtaining additional information from a local operating environment if necessary;
  executing a call according to a cloud portal manager API to synchronize the addition or modification as well as the additional information to the cloud domain; and
  updating the last scanned event index to reflect the above processing.

14. The computer of claim 11, wherein the system directory information includes user groups and organization units as directory objects to be synchronized to the cloud domain.

15. The computer of claim 11, wherein the cloud domain provides cloud-based services including hosted applications or hosted desktops, and the cloud directory controller maintains system directory information for users using the cloud-based services within the cloud domain.

16. The computer of claim 15, wherein the cloud domain includes a cloud portal manager providing an interface to the cloud directory controller from the primary domain controller.

* * * * *